(12) United States Patent
Seth et al.

(10) Patent No.: US 11,379,435 B2
(45) Date of Patent: Jul. 5, 2022

(54) SYSTEM AND METHOD FOR AUTOMATED DOCUMENT GENERATION

(71) Applicant: S-Ancial PTE Ltd, Singapore (SG)

(72) Inventors: Pradip Kumar Seth, Mumbai (IN); Shailendra Raj Mehta, Ahmedabad (IN)

(*) Notice: Subject to any disclaimer, the term of this patent is extended or adjusted under 35 U.S.C. 154(b) by 224 days.

(21) Appl. No.: 16/543,050

(22) Filed: Aug. 16, 2019

(65) Prior Publication Data

US 2021/0049133 A1 Feb. 18, 2021

(51) Int. Cl.
*G06F 16/21* (2019.01)
*G06N 20/00* (2019.01)
*G06F 16/2455* (2019.01)
*G06F 40/103* (2020.01)

(52) U.S. Cl.
CPC .......... *G06F 16/21* (2019.01); *G06F 16/2455* (2019.01); *G06N 20/00* (2019.01); *G06F 40/103* (2020.01)

(58) Field of Classification Search
CPC ....................................... G06F 16/21
USPC ........................................... 707/792
See application file for complete search history.

(56) References Cited

U.S. PATENT DOCUMENTS

| | | | |
|---|---|---|---|
| 2017/0017903 A1* | 1/2017 | Gray | G06F 3/14 |
| 2019/0006027 A1* | 1/2019 | Sacaleanu | G16H 50/30 |
| 2020/0034357 A1* | 1/2020 | Panuganty | G06F 16/248 |
| 2020/0160122 A1* | 5/2020 | Lints | G06N 20/20 |
| 2020/0371647 A1* | 11/2020 | Gerges | G06F 40/151 |

\* cited by examiner

*Primary Examiner* — Syling Yen
(74) *Attorney, Agent, or Firm* — RC Trademark Company (57) ABSTRACT

Disclosed is a system for automated document generation. The system comprises a database arrangement comprising a plurality of structured data records and a processing arrangement communicably coupled to the database arrangement. The processing arrangement receives a user input from a user relating to at least: a type of the document to be generated, information to be included in the document to be generated. Moreover, the processing arrangement analyzes user input relating to the type of document to be generated to determine related structured data records to be retrieved from the database arrangement, retrieves the related structured data records from the database arrangement, analyzes the related structured data records to determine attributes for the document to be generated and uses the determined attributes and the user input relating to the information to be included in the document to be generated to generate the document.

9 Claims, 2 Drawing Sheets

SYSTEM AND METHOD FOR AUTOMATED DOCUMENT GENERATION

TECHNICAL FIELD

The present disclosure relates generally to document preparation; and more specifically, to systems and methods for automated document generation.

BACKGROUND

With increasing value of digital content, there arises a need for better amalgamation of content related to a company into digital form (such as documents). Specifically, such digital content, generated as documents, serves as a powerful tool to enhance operability of the company, improve brand value of the company, increase awareness about the company, analyze processes in the company, and so forth. In this regard, documents are generated are for various purposes, for example, presentations, business proposals, portfolio, press release, data crunching, and the like.

Notably, a document relating to a company include data records that is relevant to the document and specific to the company. In other words, every document has specific content associated therewith. In an example, a business proposal document of a company may include data records such as net worth of the company, turnaround time estimation, estimated cost and the like. In another example, a sales report of a company may include data records related to net unit sales, net worth sales, net profit, net loss, and the like. However, it will be appreciated that such sales report will not include data records related to investments, holdings, businesses, brands and the like associated with the company.

Presently, one such document is generated by manually curating data records relevant to the document. In addition, the document is formatted manually to enhance appearance and readability, ensure clarity and conciseness and the like. Furthermore, the document requires to be updated with current trends. In other words, the document should reflect current trends followed in generating documents similar to the document. In an example, a previous trend for generating a business proposal may be to include a brand name, service(s) offered, turnaround time for the service(s) and cost for the service(s). However, a current trend for generating a business proposal may be to include Company's moto, Investors, brand name, service(s) offered, turnaround time for the service(s) and cost for the service(s).

Therefore, generation of the documents is recognized as a challenging and time-consuming task. The generation of the documents requires large amount of manual effort thereby making the task tedious and monotonous for a person responsible for regularly generating such documents. In addition, generation of the documents manually is prone to human errors and may require multiple proof readings. Additionally, data records referenced for generating a document may change with a change in trend. Subsequently, a quality of a document generated manually by a user is dependent on knowledge of current trends and/or skills of the user thereby leading to a requirement of a skilled personnel for document generation. Therefore, generation of documents that conforms to the current trend may be difficult for personnel with ordinary skills. Additionally, generation of documents by skilled personnel is a time-consuming and laborious task.

Therefore, in light of the foregoing discussion, there exists a need to overcome the aforementioned drawbacks associated with conventional process of generation of documents.

SUMMARY

The present disclosure seeks to provide a system for automated document generation. The present disclosure also seeks to provide a method for automated document generation. The present disclosure seeks to provide a solution to the existing problem of immense amount of time and manual-effort involved in generation of a document. An aim of the present disclosure is to provide a solution that overcomes at least partially the problems encountered in prior art, and provides a system that analyses user input to determine related structured data records that enable automated generation of document with human intervention.

In one aspect, an embodiment of the present disclosure provides a system for automated document generation, the system comprising:
  a database arrangement comprising a plurality of structured data records;
  a processing arrangement communicably coupled to the database arrangement, the processing arrangement operable to:
    receive a user input from a user relating to at least: a type of the document to be generated, information to be included in the document to be generated;
    analyze user input relating to the type of document to be generated to determine related structured data records to be retrieved from the database arrangement;
    retrieve the related structured data records from the database arrangement;
    analyze the related structured data records to determine attributes for the document to be generated;
    use the determined attributes and the user input relating to the information to be included in the document to be generated, to generate the document.

In another aspect, an embodiment of the present disclosure provides a method for automated document generation, the method is implemented via a system comprising a database arrangement comprising a plurality of structured data records, wherein the database arrangement is communicably coupled to a processing arrangement, the method comprising:
  receiving a user input from a user relating to at least: a type of the document to be generated, information to be included in the document to be generated;
  analyzing user input relating to the type of document to be generated to determine related structured data records to be retrieved from the database arrangement;
  retrieve the related structured data records from the database arrangement;
  analyzing the related structured data records to determine attributes for the document to be generated;
  using the determined attributes and the user input relating to the information to be included in the document to be generated, to generate the document.

In yet another aspect, an embodiment of the present disclosure provides a computer program product comprising non-transitory computer-readable storage media having computer-readable instructions stored thereon, the computer-readable instructions being executable by a computerized device comprising processing hardware to execute an aforesaid method.

Embodiments of the present disclosure substantially eliminate or at least partially address the aforementioned problems in the prior art, and enables automated generation of a document comprising information in clear and concise manner, that substantially reduces events of inconsistency and errors in the document and further reduces time and manual-effort in generation thereof.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for automated document generation, the system comprising:
  a database arrangement comprising a plurality of structured data records;
  a processing arrangement communicably coupled to the database arrangement, the processing arrangement operable to:
    receive a user input from a user relating to at least: a type of the document to be generated, information to be included in the document to be generated;
    analyze user input relating to the type of document to be generated to determine related structured data records to be retrieved from the database arrangement;
    retrieve the related structured data records from the database arrangement;
    analyze the related structured data records to determine attributes for the document to be generated;
    use the determined attributes and the user input relating to the information to be included in the document to be generated, to generate the document.

In another aspect, an embodiment of the present disclosure provides a method for automated document generation, the method is implemented via a system comprising a database arrangement comprising a plurality of structured data records, wherein the database arrangement is communicably coupled to a processing arrangement, the method comprising:
  receiving a user input from a user relating to at least: a type of the document to be generated, information to be included in the document to be generated;
  analyzing user input relating to the type of document to be generated to determine related structured data records to be retrieved from the database arrangement;
  retrieve the related structured data records from the database arrangement;
  analyzing the related structured data records to determine attributes for the document to be generated;
  using the determined attributes and the user input relating to the information to be included in the document to be generated, to generate the document.

In yet another aspect, an embodiment of the present disclosure provides a computer program product comprising non-transitory computer-readable storage media having computer-readable instructions stored thereon, the computer-readable instructions being executable by a computerized device comprising processing hardware to execute an aforesaid method.

The system for automated document generation as described in the present disclosure provides a platform for automated generation of document thereby substantially reducing time and manual-effort required in preparation of the document. Beneficially, the document generated by the system presents accurate information in incisive and interactive manner thereby enhancing readability of the document. Moreover, the document is generated automatically, using Machine-learning algorithms, that eliminate an event of incorrect interpretation of information and cognitive biases relating to information that may result in unreliable document. Additionally, the system is trained to generate different kinds of documents, for example, sales report, annual report, inventory report, investor presentation, and the likes. The system as described in the present disclosure is trained to determine a framework for the document based on a type of document to be generated, as specified by the user. Furthermore, the information provided as the user-input and/or structured information acquired from publicly available source (such as, from Internet) is inputted in the framework of the document to generate the document. In this regard, the system automatically, classifies information under sections of the framework of the document, wherein the sections of the report are described using, for example, headers. Additionally, such document generated by the system enables analysis thereof in an easy and reliable manner thereby enhancing, for example, operations, sales, management, and the like, in case of generation of a business document.

The system for automated document generation provides a platform for automated generation of the document. Notably, the document is a representation of an idea or information. Moreover, the document may be written, drawn, presented or a combination thereof. In an example, the system is employed to generate a business document such as, an annual report, a corporate presentation, an investor presentation, an earnings presentation, a press release, an earnings release, a strategy report, a business plan, a sales report, an inventory report, an investor kit, a media kit, a factsheet, and the like. In another example, the system is employed to generate an educational document such as, quizzes, questionnaires, subject presentations, class presentations, course work, research journal, and the like. Optionally, a document is classified into different sections, wherein a given section has a given type of content (namely, information) associated thereto.

Optionally, the system for automated document generation is implemented as an independent web-platform. More optionally, the system for automated document generation is implemented as a part of a web-platform, wherein the web-platform provides additional services. In an example, the system for automated document generation is implemented in conjunction with a web-platform enabling online capital market workflow, wherein the web-platform establishes channel for seamless communication between personnel (comprising, for example, corporates, corporate representatives, buy-side personnel (for example, investment manager), sell-side personnel (for example, research analyst), individual investors, and so forth) and/or bot(s). In this regard, the web-platform may further provide a comprehensive platform that creates the database arrangement storing structured data records (as discussed later, herein), enables personnel and/or bot(s) to network, enables personnel and/or bot(s) to organize and track events, enables personnel and/or bot(s) to obtain recorded conference calls organized by, for example, government bodies, assess data records provided by the personnel and/or bot(s), builds profile for personnel and/or bot(s), and enhances an overall reliability and trust for the personnel and/or bot(s). Additionally, the web-platform may enable customer relationship management thereon. Beneficially, such web-platform enables personnel of financial community to develop a deeper understanding of capital market, enhance outreach of companies, enable better research of financial market, better results (namely, profits) for investing personnel and better results for advising personnel (namely, financial managers, brokers, and the like).

Throughout the present disclosure, the term "database arrangement" refers to an organized body of data regardless of a manner in which the data or the organized body thereof is represented. The database arrangement may comprise one or more databases, wherein the one or more databases store the data therein. Moreover, optionally, the database arrangement may further comprise a database management system, wherein the database management system is operable to manage the one or more databases in the database arrangement. Optionally, the database arrangement may be hardware, software, firmware and/or any combination thereof. More optionally, the data in the database arrangement may be in the form of, for example, a table, a map, a grid, a packet, a datagram, a file, a document, and a list. Moreover, the database arrangement may include data storage software and/or systems, such as, for example, a relational database like IBM DB2 and Oracle 9.

Pursuant to embodiments of the present disclosure, the database arrangement stores the plurality of structured data records. Specifically, a data record is a digital file storing information, wherein the information is structured, unstructured, or a combination thereof. Moreover, the plurality of structured data records refer to structured (namely, organized) arrangement of the plurality of data records in at least one database of the database arrangement. In this regard, optionally, the plurality of data records are sorted, indexed, ordered, and/or categorized to form the plurality of structured data records. More optionally, the database arrangement is implemented using Amazon® S3 or Amazon® Simple Storage Service.

Optionally, the database arrangement comprising the plurality of structured data records is created by:
 extracting plurality of data records from publicly available data sources;
 analyzing one or more parameters related to each of the plurality of data records to calculate a data potency score for each of the plurality of data records, wherein one or more parameters that are analyzed for a data record are selected based on a format of the data record;
 tagging data potency score with the data record corresponding thereto;
 processing the plurality of data records with corresponding tagged data potency scores into a uniform format;
 storing the plurality of processed data records in the database arrangement as the plurality of structured data records.

Optionally, the system extracts the plurality of data records from the publicly available data sources (such as, open data repositories (for example, World Bank open data, World Health Organization (WHO) open data repository, Google® Public Data Explorer, Amazon® Web Services (AWS), Registry of Open Data (RODA) on AWS, FiveThirtyEight, DBpedia, Yelp dataset, Kaggle, and so forth), websites, and so forth) by crawling such data sources. In this regard, web-crawling framework, for example, Scrapy, Beautiful Soup, Selenium, Splash, Lua script, a combination thereof, may be employed to extract the plurality of data records publicly available data sources.

More optionally, the plurality of data records are converted into Hypertext Markup Language (HTML) prior to analysis thereof. Beneficially, converting each of the extracted plurality of data records into Hypertext Markup Language (HTML) file enables better operability or processing thereof, in regard with offline crawling on the plurality of data records. Moreover, such HTML files enable easy analysis of the one or more parameters of the plurality of data records.

Moreover, optionally, one or more parameters related to each of the plurality of data records are analyzed. In this regard, optionally, a given data record is analyzed to determine at least one of: content of the given data record, characteristic attributes (for example, design, template, style) of the given data record, an inter-relation between the content and the characteristic attributes in the given data record. Subsequently, the content, the characteristic attributes and the inter-relation therebetween in the given data record forms the one or more parameters relating to the given data record.

More optionally, the one or more parameters that are analyzed for a data record are selected based on a format of the data record. In an example, a given data record is an image; subsequently, the system determines one or more parameters (for example, aspect ratio, resolution, contour, sharpness, brightness, size, text in image, information provided by the image, and the like) associated with the image by employing Optical Character Recognition (OCR) Technique.

Furthermore, optionally, the one or more parameters are used to calculate a data potency score for the given data record. Notably, the data potency score describes a completeness and/or accuracy of content in the given data record. In this regard, optionally, the one or more parameters of the given data record is compared with one or more parameters of existing data records stored in the database arrangement and/or existing data records stored on third-party platforms. It will be appreciated that the data potency score for a given data record provides characteristic information about quality and reliability of the content in the given data record. Beneficially, the data potency score for the given data record may be employed by the system to determine how reliable the given data record is and/or how good is a quality of the given data record, with regard to the document to be generated. Moreover, optionally, the data potency score may be calculated as a percentage value, as a score (for example, on a scale of 0-1, 0-10, and the like). Moreover, the data potency score for the given data record may be employed by a user for assessment of the data record thereby enabling the user to have knowledge about quality of the data record in comparison to data records generated by other users in, for example, similar business setting. It will be appreciated that information provided by a company in public domain play a crucial role in determining trust and reliability of the company for its stakeholders. Therefore, by assessing the quality of such information (stored in, for example, the data record) provided by the company, the data potency score provides a reliable measure of assessment to the stakeholders and the company itself.

Optionally, machine learning algorithms (as discussed herein, later) are employed for at least one of: determining the format of the given data record, determining the one or more parameters related to the given data record, analysis of the one or more parameters, generation of the data potency score for the given data record. In an example, k-means algorithm is employed to analyze one or more parameters associated with a given data record to generate data potency score associated therewith. In this regard, the k-means algorithm operates to plot datapoints (forming the one or more attributes) associated with the given data record onto a hyperbolic space. Additionally, datapoints associated with other data records are also plotted onto the hyperbolic space. Subsequently, datapoints are clustered thereby enabling sorting or classification of the one or more parameters in the given document. Moreover, the data potency score for the given data record is generated based on, for example, a comparison between a number of datapoints from other data records in a cluster and a number of datapoints from the given data record in the cluster.

Furthermore, optionally, the data potency score for the given data record is tagged (namely, associated) with the given data record and further processed into the uniform format. Each of the plurality of data records to be stored in the database arrangement is processed into the uniform format thereby enabling system to efficiently perform analysis thereupon. In an instance, each of the plurality of data records are processed so as to create different types of file for different purposes. In such case, each of the plurality of data records is converted to, for example, .csv file, .text file, .html file. Moreover, .csv files of the plurality of data records are employed to implement machine learning algorithms thereon for generating the document, the .text files of the plurality of data records are employed for content (for, for example, topic modelling) in the document to be generated, and .html file of the plurality of data records are employed for parsing data in each of the plurality of data records into, for example, content, design, and images.

Additionally, optionally, the plurality of processed data records are stored in the database arrangement as the plurality of structured data records. It will be appreciated that the plurality of processed data records may be stored in one or more databases of the database arrangement. In this regard, optionally, different databases of the database arrangement may comprise different data from the plurality of data records based on different use of the different databases. In an instance, different formats of files associated with the plurality of data records may be stored in different databases. In another instance, different category or type of files associated with the plurality of data records may be stored in different databases. In such case, a first database may store a number of data records relating to investor presentation, a second database may store a number of data records relating to press release, and a third database may store a number of data records relating to company profile. More optionally, a form of the plurality of structured data records is at least one of: spreadsheet, digital document, image, presentation program, audio, video. Subsequently, the plurality of structured data records are stored as files having format, for example, .xls, .ppt, .doc, .pdf, .jpeg, .png, and the like.

Throughout the present disclosure, the term "processing arrangement" refers to a computational element that is operable to respond to and processes instructions that drive the system. Optionally, the processing arrangement includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processing arrangement" may refer to one or more individual processors, processing devices and various elements associated with a processing device that may be shared by other processing devices. Additionally, the one or more individual processors, processing devices and elements are arranged in various architectures for responding to and processing the instructions that drive the system. Optionally, the processing arrangement is implemented as a remote server.

The processing arrangement is communicably coupled to the database arrangement. In this regard, the processing arrangement may be communicably coupled to the database arrangement using a data communication network. Moreover, the term "data communication network" refers to individual networks, or a collection thereof interconnected with each other and functioning as a single large network. Optionally, such data communication network is implemented by way of wired communication network, wireless communication network, or a combination thereof. It will be appreciated that physical connection is established for implementing the wired network, whereas the wireless network is implemented using electromagnetic wave. Examples of such data communication network include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G)

telecommunication networks, fourth generation (4G) telecommunication networks, fifth generation (5G) telecommunication networks, Worldwide Interoperability for Microwave Access (WiMAX), and different generation of Wireless access (Wi-Fi a, b, an, ac, ax) networks.

In an instance, the processing arrangement of the system created the database arrangement. In another example, an external system comprising a processing unit (such as a third-party system) creates the database arrangement.

The processing arrangement is operable to receive the user input from the user relating to at least: the type of the document to be generated, information to be included in the document to be generated. Notably, the user input refers to data, control instructions or controlling information provided by the user to the system. It will be appreciated that the user input specifies preferences and/or requirements of the user with regard to the document to be generated. In this regard, the user may employ a computational element (for example, mobile phone, laptop, desktop, tablet, and the like) to provide the user input to the processing arrangement. Moreover, the user input relates to the type of the document to be generated and/or the information to be included in the document to be generated. Optionally, the user refers to a person or bot using the system. Optionally, the system provides user-selectable options (for example, drop-down menus, a list, and the like) to enable the user to provide the user input. More optionally, the system provides input fields to enable the user to provide the user input.

Notably, the user input relating to the type of the document to be generated specifies characteristic information relating to the document. In this regard, the user may provide the user input relating to at least one of: a category of the document, characteristic attributes of the document, format of the document. Optionally, the category of the document may specify a class of the document based on usage thereof, for example, sales document, annual report document, educational coursework document, and the like. More optionally, the characteristic attributes of the document may specify preferences of the user pertaining to the document, such as color, font size, font style, font color, template, style, and the like. Furthermore, the format of the document may be, for example, a Microsoft® word document (.doc), Adobe® Portable Document Format (.pdf), Microsoft® presentation (.ppt), Microsoft® spreadsheet (.xls), image (.jpeg, .png, and so forth), Google® spreadsheet, Google® document, and the like. In an example, the user specifies the type of document as an annual report for an organization 'X', wherein the annual report is to be generated in a Portable Document Format (PDF).

Moreover, the user input relating to information to be included in the document to be generated may specify characteristic information to be included in the document. The information to be included in the document may be, for example, a new idea or concept, a new strategy, statistical data, text information, image, and the like. It will be appreciated that the information to be included may not be available in public domain such as, the Internet (namely, new information) and/or the information may be a confidential matter. Optionally, the system provides the information to be included in the document by, for example, uploading a file comprising the information, providing an address of the file comprising the information, providing the information in an input field on the system, and the like.

The processing arrangement is operable to analyze user input relating to the type of document to be generated to determine related structured data records to be retrieved from the database arrangement. It is to be understood that the user-input specifying the requirement and/or preference with regard to the document to be generated is analyzed so as to determine the related structure data records. Subsequently, the related structured data records are data records that are similar to the document to be generated in terms of, for example, content, style, and the like. Optionally, the related structured data records are determined based on at least one of: category of the document, characteristic attributes of the document, format of the document. In an example, a user provides user-input to specify that a type of a document to be generated is an annual report for an organization 'X' for a year 'Y'. In such case, related structural data records may comprise one or more annual reports previously published (specifically, before the year 'Y') by the organization 'X', annual reports previously published (specifically, before the year 'Y') by other organizations that are similar to the organization 'X' and/or annual reports published in the year 'Y' by other organizations that are similar to the organization 'X'.

The processing arrangement is operable to retrieve the related structured data records from the database arrangement. In this regard, the related structured data records are retrieved from the database arrangement to a local storage associated with the processing arrangement. The local storage may include, but is not limited to, a Random-Access Memory (RAM), a Read Only Memory (ROM), a cache memory, a flash memory, an optic memory disk, magnetic memory disk, an electro-magnetic memory disk, or a combination thereof. Beneficially, retrieving the related structured data records from the database arrangement enhances run-time of the system thereby enabling faster generation of the document.

Optionally, the related structured data records are determined based on data potency score associated with the plurality of structured data records in the database arrangement. More optionally, a first set of related structured data records is determined based on similarity between, for example, category of the document to be generated and structured data records stored in the database arrangement. Furthermore, a second set of related structured data records is determined from the first set of related structured data records based on data potency score associated with structured data records comprising the first set. In this regard, structured data records in the first set having higher data potency score than a threshold are determined to form the second set thereby eliminating data records having substandard quality that may hamper a quality of document to be generated.

The processing arrangement is operable to analyze the related structured data records to determine attributes for the document to be generated. Notably, the attributes for the document to be generated forms a framework for the document to be generated. Moreover, the attributes for the document to be generated are dependent on attributes associated with the related structured data records. Specifically, the processing arrangement evaluates each of the related structured data records to interpret attributes thereof. Examples of attributes associated with a related structured data record may include, but are not limited to, headers in the related structured data record, design of the related structured data record, color tone of the related structured data record, template of the related structured data record, style of representation of statistical data in the related structured data record, style of insertion of image in the related structured data record, formatting of the related structured data record, margin in the related structured data record, and style of text in the related structured data record.

It will be appreciated that the related structured data records may have different format (for example, .doc, .ppt, .xls, .pdf, .jpeg, .png, and the like) with respect to each other. In this regard, different related structured data records may be analyzed using different techniques. It will be appreciated that a related structured data record is analyzed using a technique that is compliant to a format of the related structured data record. In an example, the related structured data records are analyzed by employing Optical character Recognition (OCR) technique. In another example, the related structured data records are analyzed by employing Amazon® Textract service. In yet another example, the related structured data records are analyzed by employing Amazon® SageMaker service, wherein the analysis of the related structured data records are performed using machine learning algorithms.

Optionally, the system employs machine learning algorithms for automated document generation. Specifically, the 'machine learning algorithms' refer to a category of algorithms employed by the processing arrangement that allows the processing arrangement to become more accurate in generating the document, without being explicitly programmed. More specifically, the machine learning algorithms are employed to artificially train the processing arrangement so as to enable the processing arrangement to automatically learn, from analyzing training dataset and improve performance from experience, without being explicitly programmed.

It will be appreciated that the machine learning algorithms employed by the processing arrangement is trained using a training dataset. Optionally, the processing arrangement may employ different types of machine learning algorithms, depending upon the training dataset employed. Typically, examples of the different types of machine learning algorithms, depending upon the training dataset employed for training the processing arrangement comprise, but are not limited to: supervised machine learning algorithms, unsupervised machine learning algorithms, semi-supervised learning algorithms, and reinforcement machine learning algorithms. Furthermore, the processing arrangement is trained by interpreting patterns in the training dataset and adjusting the machine learning algorithms accordingly to get a desired output.

More optionally, the processing arrangement, employing the machine learning algorithms, is trained using semi-supervised learning techniques. The term "semi-supervised learning techniques" refers to a learning technique employed by the machine learning algorithms to train the processing arrangement using a labeled training dataset as well as an unlabeled training dataset. Specifically, the labeled training dataset comprises a small corpus of labeled data for supervised learning of the processing arrangement. Furthermore, the unlabeled training dataset comprises a comparatively large corpus of unlabeled data for unsupervised learning of the processing arrangement. Beneficially, semi-supervised learning techniques significantly improves the quality of generated output and reduces training time for the machine learning algorithms.

Typically, the labeled training dataset comprises a desired output. Moreover, the supervised learning technique enables the machine learning algorithms to derive feedback pertaining to accuracy of output (namely, document) generated by the processing arrangement, during training. In other words, the supervised learning technique enables an instructor (such as, a human and/or a bot) to train the machine learning algorithms by providing labeled training dataset and further providing a feedback pertaining to the accuracy of the output generated by the machine learning algorithms. Moreover, upon finding any error, the machine learning algorithms modify thereto accordingly. Alternately, unlabeled training dataset for unsupervised training of the processing arrangement do not have a desired output and no means for guidance (namely, feedback) is provided to the machine learning algorithms.

More optionally, the machine learning algorithms employ clustering algorithms. It will be appreciated that the clustering algorithms groups a set of objects (such as, datapoints) such that objects in a group are similar to each other. In this regard, the clustering algorithms are employed to determine content from the user input relating to the information to be included in the document similar to content in related structured data records. Moreover, clustering algorithms are used to determine the attributes for the document to be generated based on attributes associated with the related structured data records. In an example, k-means clustering algorithms are used for mapping content for the document based on attributes associated with the document, wherein the attributes associated with the document are similar to attributes associated with the related structured data records and the content for the document is similar to the content in related structured data records.

Beneficially, the use of the machine learning algorithms to train the system provides greater efficiency, enhanced runtime, and efficient utilization of resources and computational power. Moreover, the machine learning algorithms are trained using unsupervised learning techniques and semi-supervised learning techniques, so as to train the system efficiently, without employing large labeled training datasets and with optimal computational power.

In an example, the machine learning algorithms employed by the processing arrangement are trained using semi-supervised machine learning techniques. Subsequently, the machine learning algorithms are first trained using labelled training dataset comprising labelled manually generated documents based on user input. Furthermore, the machine learning algorithms is trained using unlabeled documents for training thereof. Moreover, optionally, Amazon® Web services is employed to build, train and deploy the machine learning algorithms for the processing arrangement. In this regard, Amazon® SageMaker and TensorFlow™ may be employed.

Moreover, optionally, the processing arrangement may employ machine learning algorithms to determine images from public sources, for example, FLATICON®, Shutterstock®, and the like to be included in the document. In this regard, a given image is determined for the document, if images similar to the given image form the attributes of the related structured data records.

The processing arrangement is operable to use the determined attributes and the user input relating to the information to be included in the document to be generated, to generate the document. It will be appreciated that the determined attributes associated with the document to be generated is based on attributes associated with the related structured data records. Moreover, the user input relating to the information to be included in the document to be generated may comprise specific or new information to be included in the document. Additionally, the document is generated in a format defined by the user. Furthermore, optionally, the report may be communicated to the user via, an electronic mail (e-mail), a SMS, an address for downloading the document, and so forth.

In an example, the document to be generated is an annual report for a company. In such case, attributes determined for generation of the document may include plurality of headers and content and/or sub-headers associated with each of the plurality of headers. Moreover, the plurality of header may be, for example, Highlights, Contents, Company's overview, C-suite's message or Letter to Shareholders, Strategic reporting, Director's report and MD&A, Corporate governance, Sustainability, Financial statements, Shareholder Information, Type and Features, and Online Annual report. Additionally, the Highlights header may have sub-headers as Financial data, Key P&L figures, Balance sheet highlights, other operational highlights, and Key Financial ratios. It will be appreciated that the content associated with the related structured data records are analyzed to form the content for the document to be generated. Furthermore, content in each of the related structured data records are evaluated to form basis for content for the document to be generated. In other words, the system interprets the content in each of the related structured data records to understand a kind or type of content to be included under the headers on the document. Subsequently, the user input relating to the information to be included in the document is analyzed to determine content for each of the plurality of headers. Optionally, content for some headers, for example, company's overview, may be acquired from the related structured data records, if such content is not available in the user input. In this regard, the processing arrangement may transform existing content from the related structured data records for use in the document.

The present disclosure also relates to the method as described above. Various embodiments and variants disclosed above apply mutatis mutandis to the method.

Optionally, the method comprises creating the database arrangement comprising the plurality of structured data records by:
  extracting plurality of data records from publicly available data sources;
  identifying a class of each of the plurality of data records, wherein a class of a data record is based on a format of the data record;
  analyzing one or more parameters related to each of the plurality of data records to calculate a data potency score for each of the plurality of data records, wherein one or more parameters that are analyzed for a data record are selected based on the class of the data record;
  tagging data potency score with the data record corresponding thereto;
  processing the plurality of data records with corresponding tagged data potency scores into a uniform format;
  storing the plurality of processed data records in the database arrangement as the plurality of structured data records.

Optionally, the method comprises processing the plurality of data records into Hypertext Markup Language (HTML) for uniform formatting thereof.

Optionally, the method employs machine learning algorithms for automated document generation.

More optionally, the machine learning algorithms employ clustering algorithms.

Optionally, a form of the plurality of structured data records is at least one of: spreadsheet, digital document, image, presentation program, audio, video.

DETAILED DESCRIPTION OF THE DRAWINGS

Figure 1:
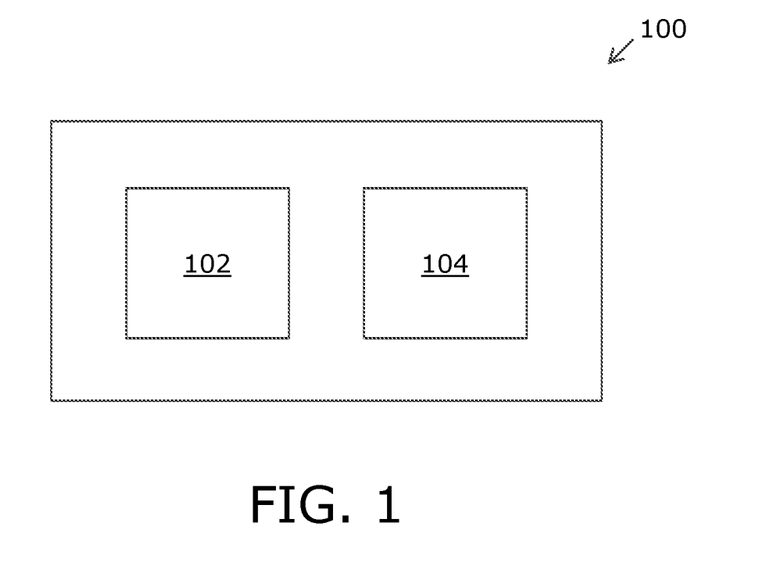
FIG. 1 is a schematic illustration of a system for automated document generation, in accordance with an embodiment of the present disclosure.

Referring to FIG. 1, there is shown a schematic illustration of a system 100 for automated document generation, in accordance with an embodiment of the present disclosure. The system 100 comprises a database arrangement 104 comprising a plurality of structured data records (not shown) and a processing arrangement 102 communicably coupled to the database arrangement 104. The processing arrangement 102 is operable to receive a user input from a user relating to at least: a type of the document to be generated, information to be included in the document to be generated. Moreover, the processing arrangement 102 is operable to analyze user input relating to the type of document to be generated to determine related structured data records to be retrieved from the database arrangement 104 and retrieve the related structured data records from the database arrangement 104. The processing arrangement 102 is operable to analyze the related structured data records to determine attributes for the document to be generated and use the determined attributes and the user input relating to the information to be included in the document to be generated, to generate the document.

FIG. 1 is merely an example, which should not unduly limit the scope of the claims herein. It is to be understood that the simplified illustration of the system 100 for automated document generation is provided as an example and is not to be construed as limiting the system 100 to specific numbers, types, or arrangements of the processing arrangement. A person skilled in the art will recognize many variations, alternatives, and modifications of embodiments of the present disclosure.

Figure 2:
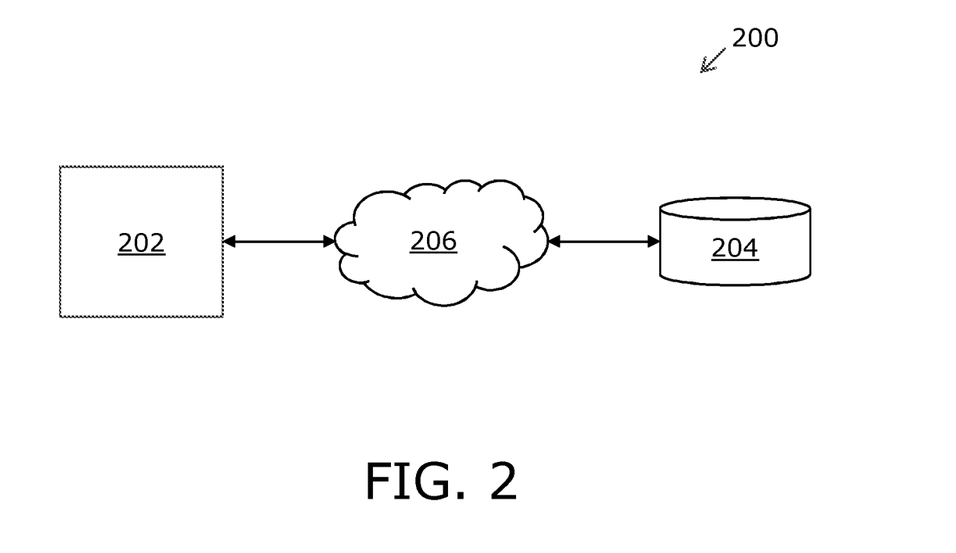
FIG. 2 is a schematic illustration of a network environment, wherein a system for automated document generation is implemented, in accordance with an embodiment of the present disclosure.

Referring to FIG. 2, there is shown a schematic illustration of a network environment 200 wherein a system for automated document generation is implemented, in accordance with an embodiment of the present disclosure. The network environment 200 comprises a processing arrangement 202 and a database arrangement 204. As shown, the processing arrangement 202 is communicably connected to the database arrangement 204, via a data communication network 206.

FIG. 2 is merely an example, which should not unduly limit the scope of the claims herein. It is to be understood that the specific designation for the network environment 200 is provided as an example and is not to be construed as limiting the network environment 200 to specific numbers, types, or arrangements of processing arrangement, database arrangement and data communication network. A person skilled in the art will recognize many variations, alternatives, and modifications of embodiments of the present disclosure.

Figure 3:
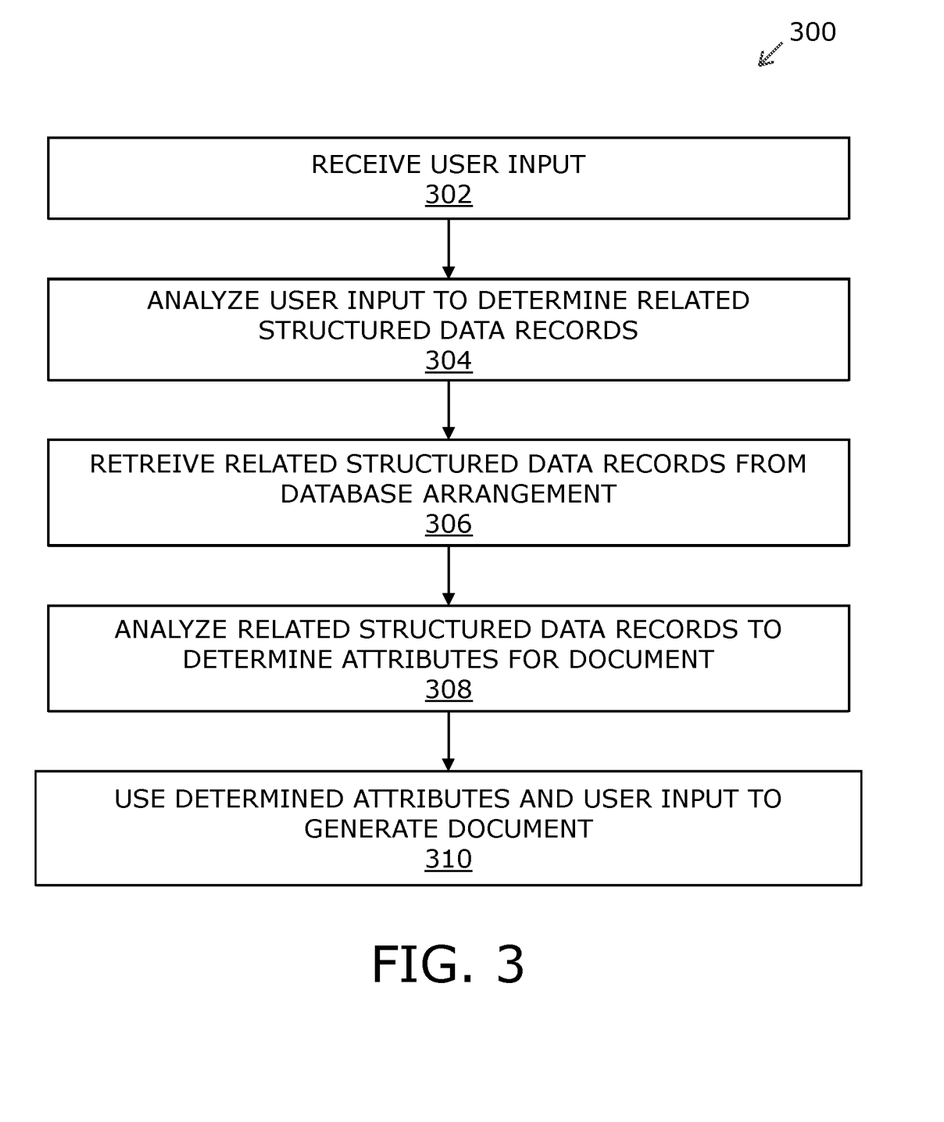
FIG. 3 is a flow chart depicting steps of a method for automated document generation, in accordance with an embodiment of the present disclosure.

Referring to FIG. 3, there is shown a flow chart depicting steps of a method 300 for automated document generation, in accordance with an embodiment of the present disclosure. The method 300 is depicted as a collection of steps in a logical flow diagram, which represents a sequence of steps that can be implemented in hardware, software, or a combination thereof, for example as aforementioned.

The method 300 for automated document generation is implemented via a system comprising a database arrangement comprising a plurality of structured data records, wherein the database arrangement is communicably coupled to a processing arrangement. At a step 302, a user input is received from a user relating to at least: a type of the document to be generated, information to be included in the document to be generated. At a step 304, user input relating to the type of document to be generated is analyzed to determine related structured data records to be retrieved from the database arrangement. At a step 306, the related structured data records are retrieved from the database arrangement. At a step 308, the related structured data records are analyzed to determine attributes for the document to be generated. At a step 310, the determined attributes and the user input relating to the information to be included in the document to be generated are used to generate the document.

The steps 302, 304, 306, 308 and 310 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for automated document generation, using machine learning algorithms, the system comprising:
    a database arrangement comprising a database management system operable to manage at least one database in the database arrangement, and wherein the database arrangement stores a plurality of structured data records in the at least one database;
    a user interface operable to provide a user input from a user to a processor;
    the processor communicably coupled to the database arrangement, the processor operable to:
        receive the user input from the user, relating to at least: a type of the document to be generated, information to be included in the document to be generated, wherein the type of the document refers to at least one of: a category of the document, characteristic attributes of the document, format of the document, and wherein the information to be included in the document to be generated comprises at least one of, a new concept, a new strategy, a statistical data, a text information, an image and wherein the information to be included in the document to be generated is provided by at least: uploading a file comprising the information, providing an address of the file comprising the information, providing the information in an input field on the system;
        analyze user input relating to the type of document to be generated to determine related structured data records to be retrieved from the database arrangement;
        retrieve the related structured data records from the database arrangement to a local storage associated with the processing arrangement;
        analyze the related structured data records to determine attributes for the document to be generated and wherein content in each of the related structured data records are evaluated to form basis for content for the document to be generated, wherein the system interprets the content in each of the related structured data records for including the content under a plurality of headers on the document to be generated, and wherein the user input relating to the information to be included in the document to be generated is analyzed to determine the content for the plurality of headers on the document,
    wherein the machine learning algorithms employ clustering algorithms to determine:
        the attributes for the document to be generated based on attributes associated with the related structured data records, and
        the content from the user input relating to the information to be included in the document to be generated similar to content in the related structured data records;
            use the determined attributes and the user input relating to the information to be included in the document to be generated, to generate the document, wherein the generated document is communicated to the user via the user interface.

2. The system according to claim 1, wherein the database arrangement comprising the plurality of structured data records is created by:
    extracting plurality of data records from publicly available data sources;
    analyzing one or more parameters related to each of the plurality of data records to calculate a data potency score for each of the plurality of data records, wherein one or more parameters that are analyzed for a data record are selected based on a format of the data record;
    tagging data potency score with the data record corresponding thereto;
    processing the plurality of data records with corresponding tagged data potency scores into a uniform format;
    storing the plurality of processed data records in the database arrangement as the plurality of structured data records.

3. The system according to claim 2, wherein the plurality of data records are converted into Hypertext Markup Language (HTML) prior to analysis thereof.

4. The system according to claim 1, wherein a form of the plurality of structured data records is at least one of: spreadsheet, digital document, image, presentation program, audio, video.

5. A method for automated document generation using machine learning algorithms, the method is implemented via a system comprising a database arrangement comprising a database management system operable to manage at least one database in the database arrangement, and wherein the database arrangement stores a plurality of structured data records in the at least one database, a user interface operable to provide a user input from a user to a processor, wherein the database arrangement is communicably coupled to the processor, the method comprising:
    receiving the user input from the user, relating to at least: a type of the document to be generated, information to be included in the document to be generated, wherein the type of the document refers to at least one of: a category of the document, characteristic attributes of the document, format of the document, and wherein the information to be included in the document to be generated comprises at least one of: a new concept, a new strategy, a statistical data, a text information, an image and wherein the information to be included in the document to be generated is provided by at least: uploading a file comprising the information, providing an address of the file comprising the information, providing the information in an input field on the system;
    analyzing user input relating to the type of document to be generated to determine related structured data records to be retrieved from the database arrangement;
    retrieving the related structured data records from the database arrangement to a local storage associated with the processing arrangement;

analyzing the related structured data records to determine attributes for the document to be generated, and wherein content in each of the related structured data records are evaluated to form basis for content for the document to be generated, wherein the system interprets the content in each of the related structured data records for including the content under a plurality of headers on the document to be generated, and wherein the user input relating to the information to be included in the document to be generated is analyzed to determine the content for the plurality of headers on the document, wherein the machine learning algorithms employ clustering algorithms to determine:

the attributes for the document to be generated based on attributes associated with the related structured data records, and the content from the user input relating to the information to be included in the document to be generated similar to content in the related structured data records;

using the determined attributes and the user input relating to the information to be included in the document to be generated, to generate the document, wherein the generated document is communicated to the user via the user interface.

6. The method according to claim 5, wherein the method comprises creating the database arrangement comprising the plurality of structured data records by:

extracting plurality of data records from publicly available data sources;

identifying a class of each of the plurality of data records, wherein a class of a data record is based on a format of the data record;

analyzing one or more parameters related to each of the plurality of data records to calculate a data potency score for each of the plurality of data records, wherein one or more parameters that are analyzed for a data record are selected based on the class of the data record;

tagging data potency score with the data record corresponding thereto;

processing the plurality of data records with corresponding tagged data potency scores into a uniform format;

storing the plurality of processed data records in the database arrangement as the plurality of structured data records.

7. The method according to claim 6, wherein the method comprises processing the plurality of data records into Hypertext Markup Language (HTML) for uniform formatting thereof.

8. The method according to claim 5, wherein a form of the plurality of structured data records is at least one of: spreadsheet, digital document, image, presentation program, audio, video.

9. A computer program product comprising non-transitory computer-readable storage media having computer-readable instructions stored thereon, the computer-readable instructions being executable by a computerized device comprising processing hardware to execute a method of claim 5.

* * * * *